United States Patent [19]

Inoue

[11] 4,079,263
[45] Mar. 14, 1978

[54] POWER PRODUCING SYSTEM

[75] Inventor: Kiyoshi Inoue, Tokyo, Japan

[73] Assignee: Inoue-Japan Research Incorporated, Yokohamashi, Japan

[21] Appl. No.: 559,589

[22] Filed: Mar. 18, 1975

[30] Foreign Application Priority Data

Mar. 18, 1974 Japan .................................. 49-31224
May 20, 1974 Japan .................................. 49-55616
May 20, 1974 Japan .................................. 49-55617

[51] Int. Cl.² ............................................. F02C 1/04
[52] U.S. Cl. .................................................... 290/52
[58] Field of Search ........................... 290/1, 2, 52, 54

[56] References Cited

U.S. PATENT DOCUMENTS

| | | | |
|---|---|---|---|
| 2,969,637 | 1/1961 | Rowekamp | 290/2 X |
| 3,024,366 | 3/1962 | Yanagimachi | 290/2 |
| 3,124,696 | 3/1964 | Tucker | 290/52 |
| 3,152,260 | 10/1964 | Cummings | 290/52 |
| 3,210,553 | 10/1965 | Cummings | 290/52 X |
| 3,219,831 | 11/1965 | Ray et al. | 290/2 |
| 3,751,673 | 8/1973 | Sprankle | 290/52 |

*Primary Examiner*—Robert K. Schaefer
*Assistant Examiner*—W. E. Duncanson, Jr.
*Attorney, Agent, or Firm*—Karl F. Ross

[57] ABSTRACT

A power-producing system in which a turbine and generator are hermetically sealed in a housing which can be pressurized to regulate at optimum evaporation conditions of a low-boiling fluid which is circulated through the turbine in a closed cycle including the heat exchanger for vaporizing the fluid and utilizing low thermal power such as solar power, waste heat and terrestrial heat. The cycle also includes, where necessary, a pump which may be received in the hermetically sealed housing and a further heat exchanger acting as a condenser.

10 Claims, 7 Drawing Figures

POWER PRODUCING SYSTEM

FIELD OF THE INVENTION

The present invention relates to a power-producing system and, more particularly, to a thermal engine power-producing system for producing electric power utilizing a source of heat of a relatively low temperature.

BACKGROUND OF THE INVENTION

Such a low thermal source is available in the environment in the form of waste heat, viz. from plants, incinerators and other combustion sites, in the form of solar heat and in the form of terrestrial heat obtainable at mineral springs, etc. These low thermal outputs have been believed to be impractical and have not been utilized effectively heretofore, especially for the production of electric power.

OBJECTS OF THE INVENTION

An object of the present invention is the utilization of low thermal energy readily obtainable in the environment but which has not been applied satisfactorily or efficiently for power production in a thermal engine power-producing system. The specific object of the present invention is to provide a system of the type described which is simple in structure, efficient, reliable in operation and long lived.

SUMMARY OF THE INVENTION

A system for producing electric power according to the present invention basically comprises an evaporator for heating and vaporizing a working fluid, a turbine adapted to receive and be driven by the vaporized working fluid, a generator drivingly connected to the turbine for providing an induced power output, and a condenser for cooling the working fluid from the turbine, the evaporator, turbine and condenser being connected to form a closed-loop flow path for the working fluid.

In accordance with the present invention, the working fluid has a boiling point much lower than that of water and the preferred examples of the fluid are the following, with their respective boiling points at 1 atm being indicated in parentheses:

3-methyl-1-butene [$(CH_3)_2CH{:}CH{=}CH$] (20.1° C);
1,2-butadiene[$CH_3\text{-}CH{=}C{=}CH_2$] (18.5° C);
ethylene oxide

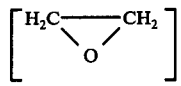

(12.5° C;
vinyl bromide [$CH_2{=}CH\text{-}Br$] (15.8° C);
40% methyl formate [$HCOOCH_3$]+8% ethyl ether [$C_2H_5OC_2H_5$]+the balance pentane [$(C_2H_5)_2CH_2$] (azeotropic boiling point = 20.4° C);
3.5% ethyl alcohol [$C_2H_5OH$] + the balance dimethylbutane (azeotropic boiling point = 26.7° C);
methyl chloride [$CH_3Cl$] (40.3° C);
trichlorofluoromethane [$CCl_3F$] (23.7° C); dichlorofluoromethane [$CHCl_2F$] (8.9° C);
trichlorotrifluoroethane [$CCl_2F\text{-}CClF_2$] (47.6° C);
dichlorotetrafluoroethane [$CClF_2\text{-}CClF_2$] (3.6° C);
dichlorohexafluorobutane [$C_3Cl_2F_6$] (35.0° C) and
dibromotetrafluoroethane [$CBrF_2\text{-}CBrF_2$] (47.26° C).

Furthermore, in the present invention, because a relatively low temperature difference is employed, it is important to avoid the leakage of the working fluid from the circulatory system and accordingly a tightly closed receptacle is provided to hermetically enclose the turbine and the engine having moving parts and, preferably, a pump as well when it is to be employed to feed the condensed working liquid to the evaporator.

Low-temperature heat can thus be utilized effectively in the present invention so that the working fluid is thereby satisfactorily evaporated to a stabilized high-pressure vapor to drive the turbine. The generator whose shaft is drivingly connected to the turbine is rotated to produce the electric power desired at its output. The vapor is prevented from its escape to avoid the loss of the efficiency of the system and also the possible contamination of the ambient environment and is returned to the condenser for recirculation.

SPECIFIC DESCRIPTION

Figure 1:
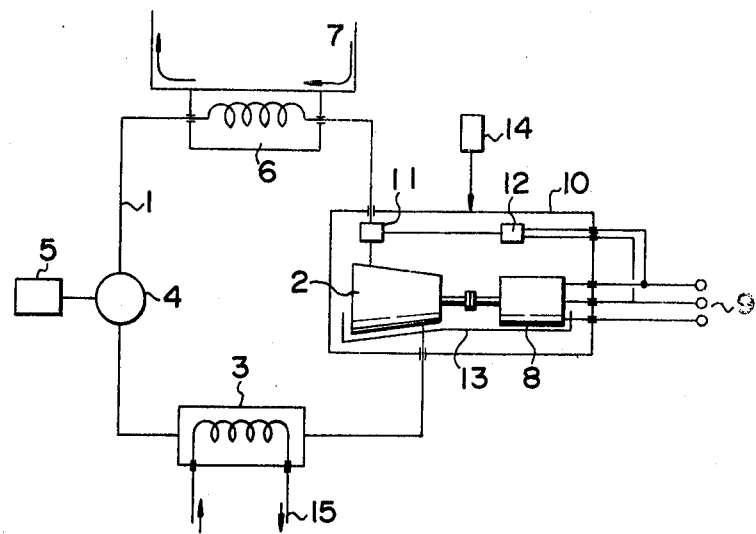
FIG. 1 is a block flow diagram of a gas-turbine power-producing system embodying the present invention.

Referring now to FIG. 1 which illustrates a basic structure of the system according to the present invention, a working fluid of the type specified before is circulated through a closed pipeline 1 commencing at the outlet of a turbine 2 and terminating at its inlet.

The condensed liquid from the condenser 3 is drawn by a pump 4 energized by a power source 5 and fed to an evaporator 6 where it is subjected to heat exchange with warm water passing through a line 7 and heated by a low-energy thermal source (not shown) as a waste heat, solar heat or terrestrial heat utilized in accordance with the present invention.

A stable, high-pressure gas working fluid is thereby produced and applied to drive the turbine 2 drivingly connected to a generator or alternator 8, at whose output terminals 9 appears the electric power desired and which may be used to drive any electrical load.

Figure 2:
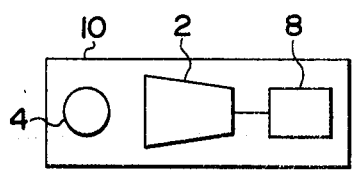
FIGS. 2A and 2B are schematic views illustrating two different fluid-tight receptacle arrangements embodying the present invention.
Figure 2:
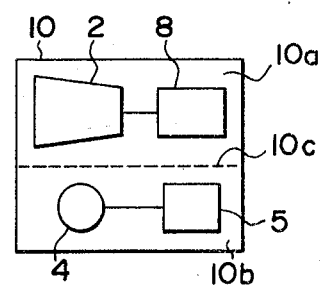

The turbine 2 and the generator 8 are enclosed hermetically in a tightly closed receptacle or chamber 10 to prevent the leakage of the working fluid therefrom. Preferably, the pump 4 is also enclosed in the chamber 10 as diagrammatically shown at FIG. 2A.

FIG. 2B shows the turbine 2 and the generator 8; and the pump 4 and its power supply 5 being enclosed in compartments 10a and 10b, respectively, of the receptacle 10 with a partition 10c.

The receptacle 3 may be formed with a window. Also, it may comprise two dividable portions one of which constitutes a cover, the other fixedly mounting thereon the turbine, the generator and the pump with pipes and electric wire conductors penetrating through openings provided through walls thereof and with suitable hermetic seals.

Designated at 11 in FIG. 1 is a valve which may be provided with a control circuit 12 connected with the output portion 9 of the generator 8, the valve being controlled by the circuit 12 to change or control the amount of the entry of the evaporated working gas or vapor into the turbine 2 in accordance with the amount of electric power produced as detected at the output portion of the generator 8. A tray 13 is also provided in the chamber 10 to serve to collect the lubricating oil from the turbine 2 and the generator 8.

For the sake of smoothing the operation of the turbine 2 and insuring its driving at a desired rate, a gas source 14 is also shown provided to introduce a pressurized gas into the chamber 10. An optimum evaporating temperature is obtained by adjusting the gas pressure of the gas source 14. The chamber or receptacle 10 should be composed of a material resistive both to pressure and corrosion and may be a metal or alloy or a synthetic resin reinforced by carbon fibers or metal wiskers.

The working vapor or gas from the turbine 2 is collected in the condenser 3 where it is subjected to heat exchange with a cooling water or other liquid passing through a line 15 to form a condensate which is then recirculated by the pump 4.

The power source 5 may be dispensed with by using a portion of the power obtained at the output terminals 9 of the generator 8 for the purpose of driving the pump 4.

In FIGS. 3 to 7 which illustrate various embodiments of the present invention, with the same numerals being used to denote same or similar parts of the system shown in FIG. 1.

Figure 3:
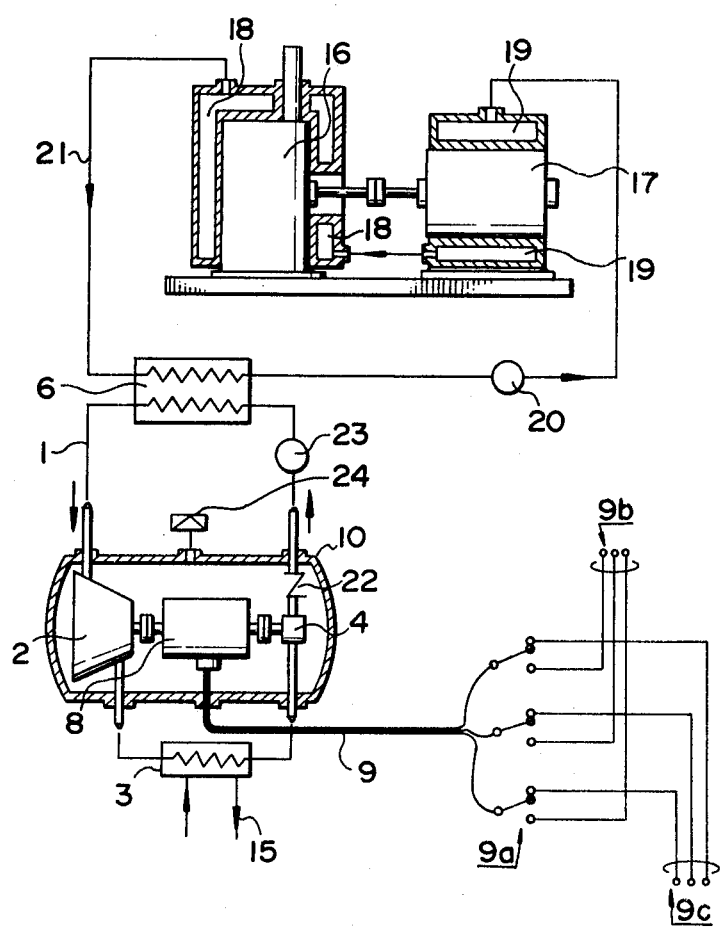
FIG. 3 is a flow diagram, with parts shown in section, of an embodiment of the invention in which waste heat from an internal combustion engine is utilized.

In the arrangement of FIG. 3, waste heat from an internal combustion engine 16 and a generator 17 driven thereby in a conventional internal combustion power generator device is utilized to produce electric power in accordance with the present invention. To this end, the engine 16 and the generator 17 are provided respectively with cooling jackets 18 and 19 communicating with each other and traversed by a coolant fluid which is circulated by a pump 20 in a closed pipeline 21. The latter includes a zone of evaporator 6 for the working fluid which is circulated by the pump 4 in the closed pipeline 1 including the turbine 2 and the condenser 3 as mentioned previously. The generator or alternator 8 drivingly connected to the turbine 2 has the output 9 which is shown connectable by a commutator 9a selectively to a starter source and to a load circuity via terminals 9b and terminals 8c. FIG. 3 also shows a check valve 22 and an accumulator 23 incorporated to insure a highly stable circulation of the working fluid in the closed loop path 1 and a pressure gauge 24 adapted to monitor the pressure within the chamber 10 to maintain it at a desired value by controlling the feeding gas from the gas source (not shown) therein in accordance with the monitoring result.

In starting the operation, the engine 16 is brought into actuation to drive the generator 17. At the same time the pump 20 is actuated to circulate the coolant fluid through the closed line 21 in the direction of the arrow while the generator 8 is coupled by the commutator 9a with the starter source 9b for energization thereby to serve as a motor for the pump 4 to circulate the working fluid in the closed line 1 in the direction of the arrow.

As the operation starts, the coolant fluid passing through the jackets 19 and 18 begins to absorb the heat emanating from the generator 17 and the engine 16 and becomes hot as it leaves the jacket 18. The heated fluid enters the evaporator 6 where it is subjected to heat exchange with the working fluid in the line 1 to become cool for return to the jackets 19 and 18 where it serves to intensely cool both the generator 17 and the engine 16 while being itself heated. On the other hand, the working fluid in the path 1, upon exchanging heat with the heating fluid is vaporized to form a high-pressure vapor driving the turbine 2 to assist the rotation of the generator 8 and is then admitted to the condenser 15 where it is precipitated. Upon a lapse of a given time, when enough electric power becomes available at the generator 8 output, the commutator 9a switches the terminal 9 to the load circuitry 9c for utilization or storage thereby of electric power being produced.

Figure 4:
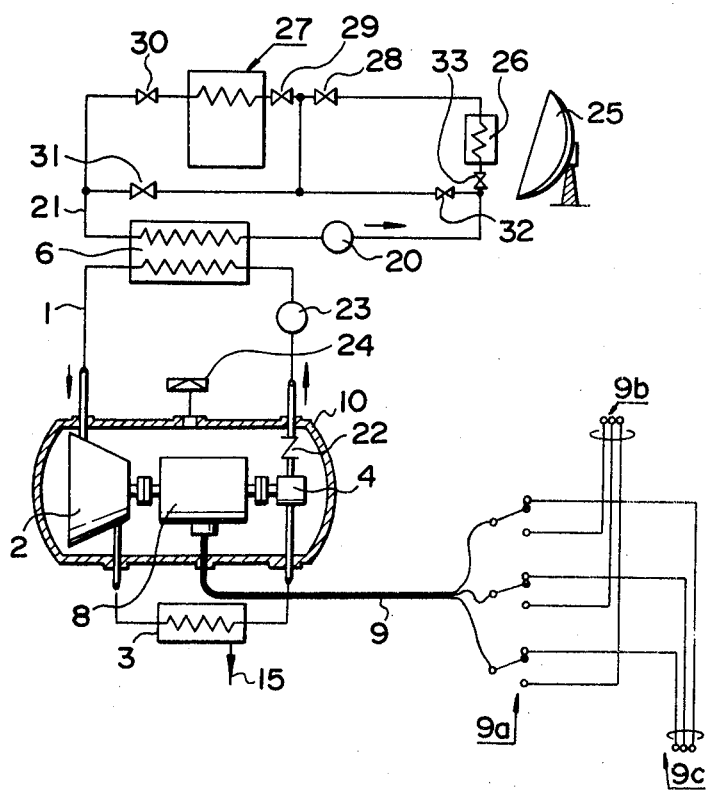
FIG. 4 is a similar diagram of another embodiment of the invention in which solar heat is utilized together with a supplemental heat source.

FIG. 4 shows another embodiment of the present invention in which solar heat is utilized to produce electric power therefrom. A mirror arrangement 25 is thus provided to collect incoming solar rays and focus them thermally upon the outer surface of a tubular heat exchanger 26 through which water flows absorbing the heat. The heated water fed by the pump 20 acts to evaporate the working fluid through the stage 6, the evaporant driving the turbine 2 to produce power at the output of the generator 8 in the manner described. The circulatory system for the heating fluid or water in this embodiment is shown supplementarily including a branch passing through a water boiler 27, switch valves 28, 29, 30, 31, 32 and 33 being also included. Thus, the thermal energy in the water boiler 27 is utilized when the solar heat is not available and may be used together with the solar heat, when the latter is available to heat the heating water to a required temperature. Thus, when only the solar heat is to be utilized, valves 28, 31 and 33 are opened with valves 29, 30 and 32 closed. When only the boiler heat is to be utilized, valves 29, 30 and 32 are opened with valves 28, 31 and 33 closed. When both the solar heat and the boiler heat are to be utilized, valves 28, 29, 30 and 33 are opened and valves 31 and 32 are closed.

Figure 5:
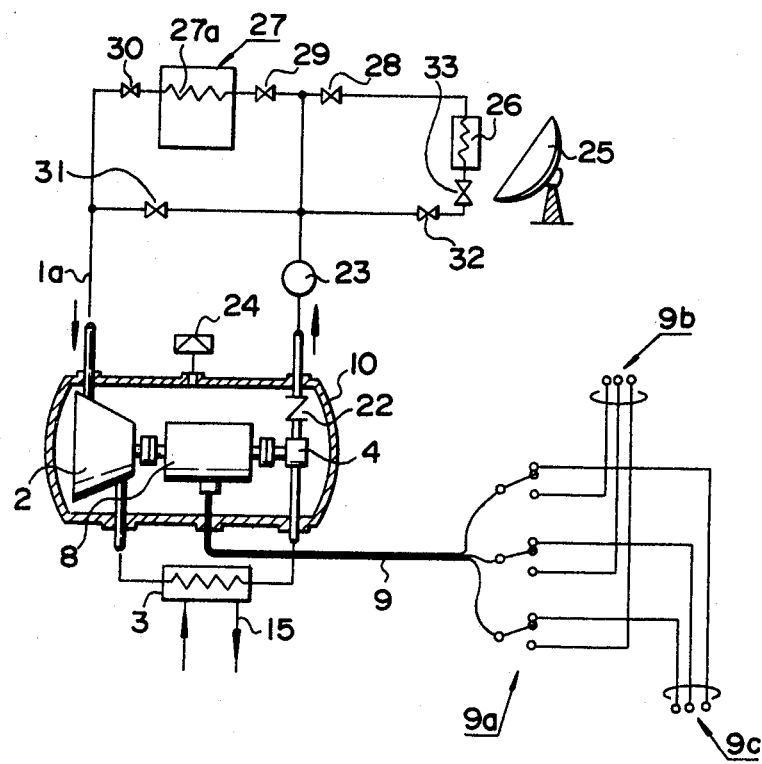
FIG. 5 is a similar view which illustrates a modification of the embodiment of FIG. 4.

The system shown in FIG. 5 represents a modification of the embodiment of FIG. 4 in which the heat exchanger 26 receiving the solar heat and the heating pipe 27a in the boiler 27 are used to directly serve as the evaporator 6 in the previous embodiments to vaporize the working fluid to be applied to the turbine 2 in the power producing cycle.

Figure 6:
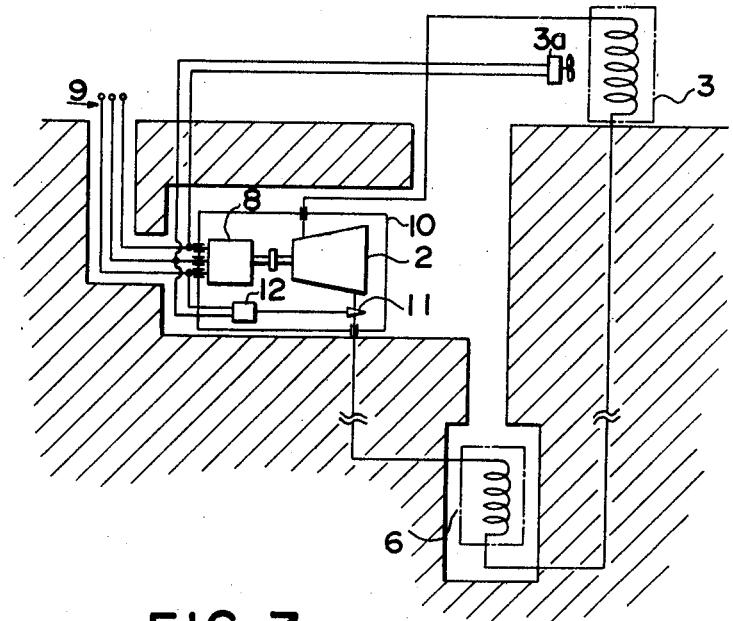
FIG. 6 is a flow diagram, with parts shown in section, of a further embodiment of the invention in which terrestrial heat is utilized.

FIG. 6 shows a further embodiment of the invention in which terresterial heat, especially the heat of a relatively low temperature as collected in a mineral spring is utilized to generate electric power therefrom. In this embodiment as well, the system components, structure and operation are basically identical to those described in connection with FIGS. 1 and 2 and a working fluid of the type mentioned previously and a tightly closed receptacle 10 containing the turbine 2 and the generator 8 are employed in accordance with the present invention. In this embodiment, the evaporator stage 6 is arranged in contact with a warm spring or vapor and may be placed at a location underground where such moderate terrestrial heat is available. The working fluid vaporized by the terrestrial thermal energy at the evaporator 6 drives the turbine 2 drivingly connected to the generator or alternator 8 in the receptacle 10 which may also be located underground, above the evaporator 6. The induced electric power is led through the output line 9 to a load circuit or storage means (not shown) and a small proportion of it is here utilized to drive a fan arrangement 3a to cool and precipitate the working fluid admitted from the turbine 2 in the condenser stage 3. The precipitated fluid is returned to the evaporator stage 6 by gravity. As in the embodiment of FIG. 1, a governor 11, 12 is shown also provided to control the rate of energy of the working vapor or gas into the turbine in accordance with the amount of electricity being produced.

Figure 7:
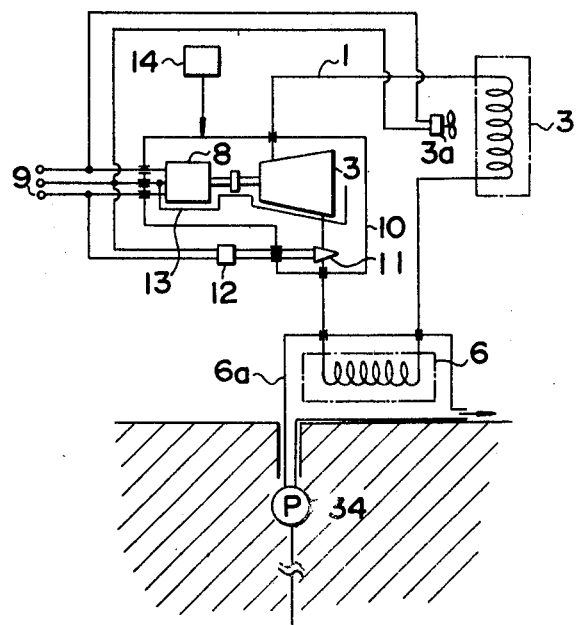
FIG. 7 illustrates a modification of FIG. 6.

In a modification of FIG. 7, the hot underground water is drawn up aboveground by a pump 34 and received in a reservoir 6a forming the evaporation chamber where it is heat-exchanged with the working fluid to vaporize it for delivery to the turbine 2 in the closed receptacle 10 which is also disposed aboveground.

In the foregoing description, it should be noted that evaporator 6, heater 26 and boiler 27a should comprise a suitable heat-exchanger member. Highly increased heat-exchanging efficiency is obtained when the surface for coming in contact with the fluid to be heated comprises a porous layer of a thermally conductive metal with interconnected minute pores. By employing the porous boiling surface, it is possible to make the evaporator 6, heater 26 and boiler 27a much compact. It is also recommended to constitute that portion of pipeline 1, 1a which mutually connects the condenser 15 and evaporator 6 stages with a heat pipe to eliminate need for the pump 4. An improved method of preparing porous heat-exchanger interfaces and heat pipes is described in copending application Ser. No. 556,203 filed Mar. 7, 1975.

I claim:

1. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchanger interface contacted on one surface with said working fluid and on the other surface with a fluid heated by a low thermal energy source, said working fluid being a fluid of a boiling point lower than that of water and being selected from the group which consists of 3-methyl-1-butene, 1,2-butadiene, ethylene oxide, vinyl bromide, azeotropic mixture of ethyl alcohol and dimethylbutane, methyl chloride, trichlorofluoromethane, dichlorofluoromethane, trichlorotrifluoroethane, dichlorotetrafluoroethane, dichlorohexafluorobutane and dibromotetrafluoroethane, said turbine and said generator being enclosed hermetically in a tightly closed receptacle.

2. The improvement defined in claim 1, further including a pump for feeding the working fluid in said condenser into said evaporator and enclosed hermetically in said receptacle.

3. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchanger interface contacted on one surface with said working fluid and on the other surface with a fluid heated by a low thermal energy source, said working fluid being a fluid of a boiling point lower than that of water and being selected from the group which consists of 3-methyl-1-butene, 1,2-butadiene, ethylene oxide, vinyl bromide, azeotropic mixture of ethyl alcohol and dimethylbutane, methyl chloride, trichlorofluoromethane dichlorofluoromethane, trichlorotrifluoroethane, dichlorotetrafluoroethane, dichlorohexafluorobutane and dibromotetrafluoroethane, said turbine and said generator being closed hermetically in a tightly closed receptacle, and means for introducing a gas into said receptacle so as to maintain the pressure therein at a given value.

4. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchanger interface contacted on one surface with said working fluid and on the other surface with a fluid heated by a low thermal energy source, said working fluid being a fluid of a boiling point lower than that of water and being selected from the group which consists of 3-methyl-1-buten, 1,2-butadiene, ethylene oxide, vinyl bromide, azeotropic mixture of ethyl alcohol and dimethylbutane, methyl chlorie, trichlorofluoromethane, dichlorofluoromethane, trichlorotrifluoroethane, dichlorotetrafluorethane, dichlorohexafluorobutane and dibromotetrafluoroethane, said turbine and said generator being enclosed hermetically in a tightly closed receptacle, and means for controlling the flow of said evaporated working fluid to said turbine in response to a signal derived at the output of said generator.

5. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchange interface contacted on one surface with said working fluid and on the other surface with a fluid heated by a low thermal energy source, said working fluid being a fluid of a boiling point lower than that of water and being selected from the group which consists of 3-methyl-1-butene, 1,2-butadiene, ethylene oxide, vinyl bromide, azeotropic mixture of ethyl alcohol and dimethylbutane, methyl chloride, trichlorofluoromethane, trichlorofluoroethane, dichlorotetrafluoroethane, dichlorohexafluorobutane and dibromotetrafluoroethane, said turbine and said generator being enclosed hermetically in a tightly closed receptacle, said surface of the evaporator in contact with said working fluid comprising a porous layer of a thermally conductive metal.

6. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchanger interface contacted on one surface with said working fluid and on the other surface with a fluid heated by a low thermal energy source, said working fluid being a fluid of a boiling point lower than that of water and being selected from the group which consists of 3-methyl-1-butene, 1,2-butadiene, ethylene oxide, vinyl bromide, azeotropic mixture of ethyl alcohol and dimethylbutane, methyl chloride, trichlorofluoromethane, dichlorofluoromethane, trichlorotrifluoroethane, dichlorotetrafluoroethane, dichlorohexafluorobutane and dibromotetrafluoroethane, said turbine and said generator being enclosed hermetically in a tightly closed receptacle, said low thermal energy source being a waste-heat recovery unit of an industrial plant, incinerator or internal combustion engine.

7. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchanger interface contacted on one surface with said working fluid and on the other surface with a fluid heated by a low thermal energy source, said working fluid being a fluid of a boiling point lower than that of water and being selected from the group which consists of 3-methyl-1butene, 1,2-butadiene, ethylene oxide, vinyl bromide, azeotropic mixture of ethyl alchohol and dimethylbutane, methyl chloride, trichlorofluoromethane, dichlorofluoromethane, trichlorotrifluoroethane, dichlorotetrafluoroethane, dichlorohexafluorobutane and dibromotetrafluoroethane, said turbine and said generator being enclosed hermetically in a tightly closed receptacle, said low thermal energy source using solar heat, and including a water boiling system.

8. In a system for producing electric power including an evaporator for heating a working fluid, a turbine adapted to receive and be driven by the evaporated working fluid, a generator drivingly connected to said turbine for generating electric power and a condenser for cooling the working fluid admitted from said turbine; said evaporator, turbine and said condenser being connected to form a closed loop flow path for the working fluid, the improvement wherein said evaporator comprises a heat-exchanger interface contacted on one surface with said working fluid and on the other surface with a fluid heated by a low thermal energy source, said working fluid being a fluid of a boiling point lower than that of water and being selected from the group which consists of 3-methyl-1-butene, 1,2-butadiene, ethylene oxide, vinyl bromide, azeotropic mixture of ethyl alcohol and dimethylbutane, methyl chloride, trichlorofluoromethane, dichlorofluoromethane, trichlorotrifluoroethane, dichlorotetrafluoroethane, dichlorohexafluorobutane and dibromotetrafluoroethane, said turbine and said generator being enclosed hermetically in a tightly closed receptacle, said low thermal energy source utilizing terrestrial heat.

9. A method of operating a power-producing system which comprises a gas turbine, an electrical generator connected to said turbine and driven thereby, and a closed working-fluid cycle connected to said turbine, said cycle including an evaporator ahead of said turbine and a condenser downstream of said turbine, said method comprising the steps of:
    circulating through said cycle a working fluid selected from the group which consists of 3-methyl-1-butene, 1,2-butadiene, ethylene oxide, vinyl bromide, azeotropic mixture of ethyl alcohol and dimethylbutane, methyl chloride, trichlorofluoromethane, dichlorofluoromethane, trichlorotrifluoroethane, dichlorotetrafluoroethane, dichlorohexafluorobutane and dibromotetrafluoroethane;
    vaporizing said working fluid by heat exchange with a low-temperature thermal-power source selected from the group which consists of solar heat, terrestrial heat and industrial waste heat to produce a vapor;
    enclosing said turbine and said generator in a hermetically sealed housing;
    driving said turbine in said hermetically sealed housing with said vaporized working fluid; and
    condensing said working fluid subsequent to the driving of said turbine therewith.

10. The method defined in claim 9, further comprising the step of pressurizing said housing with a gas other than vapor of said fluid to establish predetermined operating pressure conditions of said working fluid.

* * * * *